(12) United States Patent
Chang et al.

(10) Patent No.: US 11,841,482 B2
(45) Date of Patent: Dec. 12, 2023

(54) IMAGING LENS

(71) Applicant: Rays Optics Inc., Hsinchu County (TW)

(72) Inventors: Ching-Sheng Chang, Hsinchu County (TW); Chia-Chen Kung, Hsinchu County (TW); Chiu-Jung Lai, Hsinchu County (TW); Kuo-Chuan Wang, Hsinchu County (TW)

(73) Assignee: RAYS OPTICS INC., Hsinchu County (TW)

( * ) Notice: Subject to any disclaimer, the term of this patent is extended or adjusted under 35 U.S.C. 154(b) by 686 days.

(21) Appl. No.: 16/840,180

(22) Filed: Apr. 3, 2020

(65) Prior Publication Data

US 2020/0341240 A1 Oct. 29, 2020

(30) Foreign Application Priority Data

Apr. 29, 2019 (TW) .................................. 108114936

(51) Int. Cl.
| | |
|---|---|
| *G02B 9/04* | (2006.01) |
| *G02B 13/00* | (2006.01) |
| *G02B 7/02* | (2021.01) |
| *G02B 5/20* | (2006.01) |
| *G02B 9/34* | (2006.01) |

(52) U.S. Cl.
CPC ............ *G02B 13/004* (2013.01); *G02B 5/20* (2013.01); *G02B 7/028* (2013.01); *G02B 9/34* (2013.01)

(58) Field of Classification Search
CPC ................................ G02B 13/004; G02B 9/34
See application file for complete search history.

(56) References Cited

U.S. PATENT DOCUMENTS

| | | |
|---|---|---|
| 5,680,259 A | 10/1997 | Yamada |
| 6,950,246 B2 | 9/2005 | Amanai |
| 2017/0235098 A1* | 8/2017 | Tsai ..................... G02B 13/004 359/357 |

FOREIGN PATENT DOCUMENTS

| | | |
|---|---|---|
| CN | 103969809 A | 7/2013 |
| TW | 201326886 A | 8/2014 |

* cited by examiner

*Primary Examiner* — Joseph P Martinez
(74) *Attorney, Agent, or Firm* — Muncy, Geissler, Olds & Lowe, P.C.

(57) ABSTRACT

An imaging lens includes a first lens with a negative refractive power, a second lens with a positive refractive power, a third lens with a positive refractive power and a fourth lens with a refractive power arranged in order from a first side to a second side, and an aperture stop is disposed between the first lens and the third lens. The first lens, the second lens, the third lens and the fourth lens are made from glass, a total number of lenses with refractive powers in the imaging lens is less than 5, the second lens and the third lens are aspheric glass lenses, and a full field of view of the imaging lens is greater than 120 degrees.

20 Claims, 13 Drawing Sheets

IMAGING LENS

BACKGROUND OF THE INVENTION a. Field of the Invention

The invention relates generally to an optical system, and more particularly to an imaging lens.

b. Description of the Related Art

Recent advances in technology have led to the development of various types of imaging lenses. For example, an image pick-up lens used in a surveillance camera, an in-vehicle camera or an action camera is a commonly used imaging lens. Nowadays, there is a growing need for an imaging lens to have low fabrication costs and high optical performance. To meet these requirements, the imaging lens needs to have low fabrication costs, high resolution, large effective aperture, wide viewing angles, wide ranges of operating temperatures and light weight. Therefore, it is desirable to provide an imaging lens that may achieve lighter weight, lower fabrication costs, wider ranges of operating temperatures and better imaging quality.

BRIEF SUMMARY OF THE INVENTION

According to one aspect of the present disclosure, an imaging lens includes a first lens with a negative refractive power, a second lens with a positive refractive power, a third lens with a positive refractive power and a fourth lens with a refractive power arranged in order from a first side to a second side, and an aperture stop is disposed between the first lens and the third lens. The first lens, the second lens, the third lens and the fourth lens are made from glass, a total number of lenses with refractive powers in the imaging lens is less than 5, the second lens and the third lens are aspheric glass lenses, a full field of view of the imaging lens is greater than 120 degrees, and an operating temperature of the imaging lens is in the range of −40° C. to 125° C.

According to another aspect of the present disclosure, an imaging lens includes a first lens with a negative refractive power, a second lens with a positive refractive power and a third lens with a refractive power arranged in order from a magnified side to a minified side, and an aperture stop is disposed between the first lens and the third lens. The first lens, the second lens and the third lens are made from glass, the imaging lens has at most two glass lenses with refractive powers between the aperture stop and the minified side, a total number of lenses with refractive powers in the imaging lens is less than 5, the imaging lens has at most two aspheric glass lenses with refractive powers between the aperture stop and the minified side, a lens closest to the magnified side of the imaging lens having a positive refractive index variation as a function of temperature (dn/dt), and a ratio of an effective focal length of the imaging lens to an effective focal length of the lens closest to the magnified side being in the range of −0.6 to −0.3.

According to another aspect of the present disclosure, an imaging lens includes a first lens group with a refractive power, a second lens group with a positive refractive power, and an aperture stop disposed between the first lens group and the second lens group. The first lens group has at least one lens with a negative refractive power, and the second lens group has at least one aspheric lens with a positive refractive power. A total number of lenses with refractive powers in the imaging lens is less than 5, all lenses of the imaging lens are made from glass, a full field of view of the imaging lens is greater than 120 degrees, and an F-number of the imaging lens is in the range of 1.1 to 1.6.

According to the above aspects, the imaging lens may achieve good imaging quality, wide viewing angles, reduced fabrication costs, and lighter weight. Further, according to the above embodiments, the imaging lens is allowed to operate in the range of −40° C. to 125° C. and has a total lens number of 3 or 4. Therefore, the imaging lens may achieve good imaging quality and resolution, lower fabrication costs, larger effective apertures, wider viewing angles, lighter weight and wider ranges of operating temperatures.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.). The following embodiments of a zoom lens may be applied to any system or environment according to actual demands.

The term "optical element" refers to an element made from at least in part a material that may refract, reflect, diffract, diffuse or filter at least a portion of the light passing through it. The material may include plastic or glass, and the optical element may be, for example, a lens, a prism or an aperture stop.

In an imaging system, a magnified side may refer to one side of an optical path of an imaging lens comparatively near a subject to be picked-up, and a minified side may refer to other side of the optical path comparatively near a photosensor.

Figure 1:
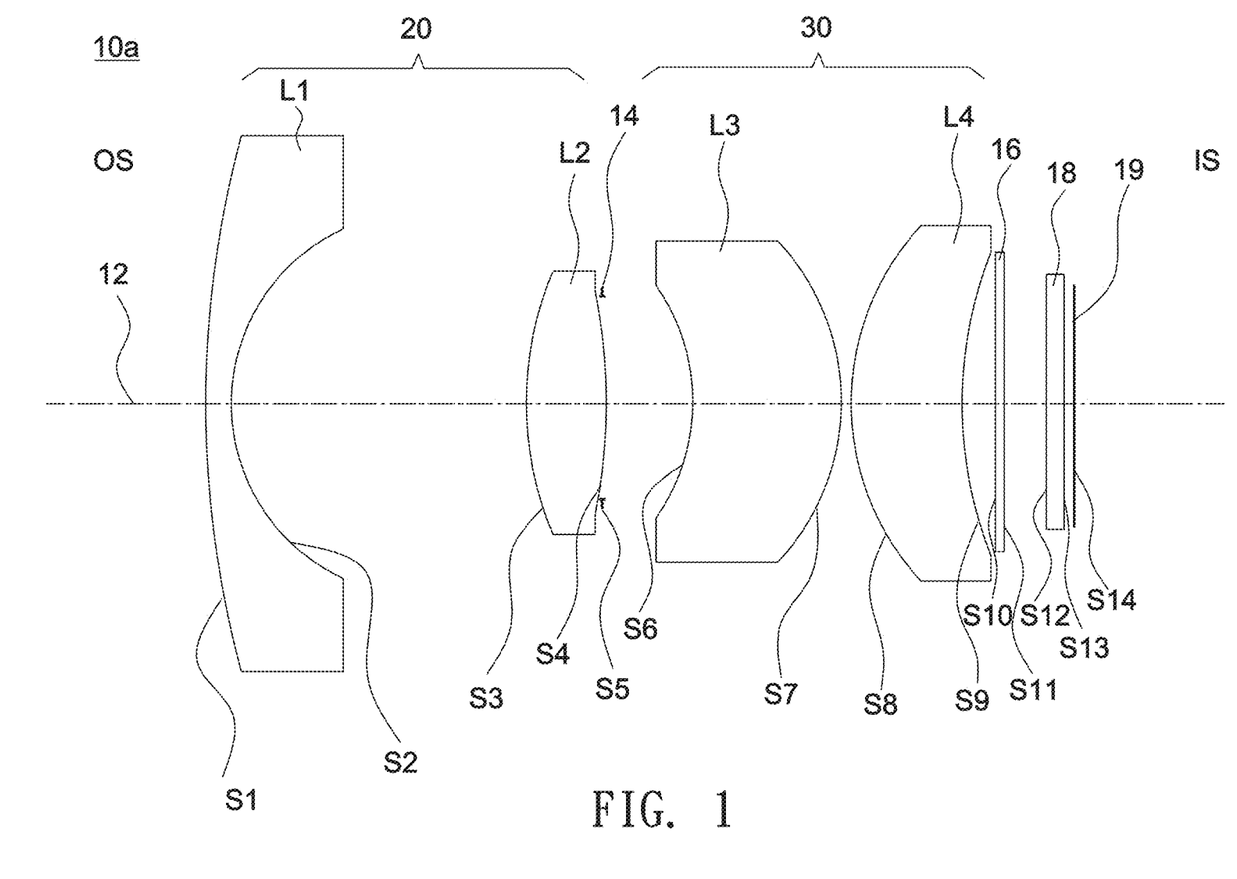
FIG. 1 shows a cross-sectional illustration of an imaging lens according to an embodiment of the invention.

FIG. 1 shows a cross-sectional illustration of an imaging lens according to an embodiment of the invention. As shown in FIG. 1, in this embodiment, the imaging lens 10a has a lens barrel (not shown), and inside the lens barrel a first lens L1, a second lens L2, an aperture stop 14, a third lens L3 and a fourth lens L4 are arranged in order from a first side (magnified side OS) to a second side (minified side IS). The first lens L1 and the second lens L2 form a first lens group 20 with a positive refractive power, and the third lens L3 and the fourth lens L4 form a second lens group 30 with a positive refractive power. Further, the minified side IS may be disposed with a light filter 16, a cover glass 18 and a photosensor (not shown), an image plane of the imaging lens 10a formed at an effective focal length for infrared light is labeled as 19, and the light filter 16 and the cover glass 18 are disposed between the second lens group 30 and the image plane 19 for infrared light. In this embodiment, the first lens L1, the second les L2, the third lens L3 and the fourth lens L4 are all made from glass and have negative, positive, positive and positive refractive powers, respectively. In this embodiment, the third lens L3 is an aspheric glass lens; in other embodiment, the aspheric glass lens may be replaced with an aspheric plastic lens. Further, in each of the following embodiments, the magnified side OS is located on the left side and the minified side IS is located on the right side of each figure, and thus this is not repeatedly described in the following for brevity.

The aperture stop 14 may be an independent component or integrally formed with other optical element. In this embodiment, the aperture stop may use a mechanic piece to block out peripheral light and transmit central light to achieve aperture effects. The mechanic piece may be adjusted by varying its position, shape or transmittance. In other embodiment, the aperture stop may be formed by applying an opaque or a light-absorbing material on a lens surface except for a central area to block out peripheral light and transmits central light.

The light filter 16 is a visible light blocking filter to block visible light or light below about 700 nm, thereby suppressing interference from unnecessary sources of light and enhancing the imaging quality on the image plane using invisible infrared light. In this embodiment, the light filter 16 is a single visible light blocking filter and disposed between the fourth lens 14 and the image plane 19. In other embodiment, multiple light filters 16 can be provided and disposed in other place. Further, in other embodiment, the light filter 16 may be an invisible light blocking filter to block infrared light or light above about 700 nm to thus suppress interference from unnecessary sources of light and enhance the imaging quality on the image plane using visible light.

Detailed optical data and design parameters of the imaging lens 10a are shown in Table 1, and Table 2 lists aspheric coefficients of each aspheric surface of the imaging lens 10a.

In the following design examples of the invention, each aspheric surface satisfies the following equation:

$$Z = \frac{cr^2}{1+\sqrt{1-(1+k)c^2 r^2}} + Ar^4 + Br^6 + Cr^8 + Dr^{10} + Er^{12} + Fr^{14} + \ldots ,$$

where Z denotes a sag of an aspheric surface along the optical axis, c denotes a reciprocal of a radius of an osculating sphere, K denotes a Conic constant, r denotes a height of the aspheric surface measured in a direction perpendicular to the optical axis 12. Table 2 lists $4^{th}$, $6^{th}$, $8^{th}$ and $10^{th}$ order aspheric coefficients A-D of the imaging lens 10a. Note the data provided below are not used for limiting the invention, and those skilled in the art may suitably modify parameters or settings of the following embodiment with reference of the invention without departing from the scope or spirit of the invention.

TABLE 1

F/# = 1.0; LT = 25.24 (mm) FOV = 150 degrees; IMH60 = 3.29(mm)

| surface | radius of curvature (mm) | interval (mm) | refractive index | Abbe number | object description |
|---|---|---|---|---|---|
| S1 | 33.38 | 0.90 | 2.05 | 26.9 | L1(meniscus) |
| S2 | 6.67 | 9.90 | | | |
| S3 | 11.64 | 2.50 | 2.05 | 26.9 | L2(bi-convex) |
| S4 | −34.53 | 0.10 | | | |
| S5 | INF. | 2.92 | | | aperture stop 14 |
| S6* | −7.76 | 5.00 | 1.80 | 40.2 | L3(aspheric) |
| S7* | −7.06 | 0.10 | | | |
| S8 | 8.49 | 3.80 | 2.05 | 26.9 | L4(meniscus) |
| S9 | 15.08 | 0.99 | | | |
| S10 | INF. | 0.30 | 1.51 | 64.1 | light filter 16 |
| S11 | INF. | 1.50 | | | |
| S12 | INF. | 0.50 | 1.51 | 64.1 | cover glass 18 |
| S13 | INF. | 0.52 | | | |
| S14 | | | | | image plane 19 |

TABLE 2

| | S6 | S7 |
|---|---|---|
| k | 6.93E−01 | −9.58E−01 |
| A | −7.16E−04 | −2.34E−04 |
| B | −2.07E−05 | 1.31E−06 |
| C | 1.73E−06 | −1.48E−07 |
| D | 3.20E−08 | 9.19E−09 |

In the above Table 1, an interval of the surface S1 is a distance between the surface S1 and the surface S2 along the optical axis 12, an interval of the surface S2 is a distance between the surface S2 and the surface S3 along the optical axis 12, and an interval of the surface S13 is a distance between the surface S13 and the image plane 19 for infrared light along the optical axis 12.

In the above table 1, the surface denoted by an asterisk is an aspheric surface, and a surface without the denotation of an asterisk is a spherical surface.

The radius of curvature is a reciprocal of the curvature. When a lens surface has a positive radius of curvature, the center of the lens surface is located towards the minified side. When a lens surface has a negative radius of curvature, the center of the lens surface is located towards the magnified side. The concavity and convexity of each lens surface is listed in the above table 1 and shown in corresponding figures.

The Symbol F/# shown in the above table is an aperture value of the aperture stop. When the imaging lens is used in an image pick-up system, the image plane is a sensing surface of a photosensor.

When the imaging lens is used in an image pick-up system, the image circle refers to a diagonal length of an image on an image plane, and a semi-diagonal image height IMH listed in the above table equals half of the image circle.

A total lens length of the imaging lens 10a is denoted as "LT" in the above table. Specifically, the total lens length LT is a distance along the optical axis 12 between a lens surface S1 closest to the magnified side and a lens surface S9 closest to the minified side. In one embodiment, the total lens length LT of the imaging lens is smaller than 32 mm.

In this embodiment, FOV denoted in the above table is a light collection angle of the optical surface S1 closest to the magnified side; that is, the FOV is a full field of view measured diagonally.

In this embodiment, IMH60 denoted in the above table is a semi-diagonal image height on the image plane 19 measured at a half field of view of 60 degrees.

In this embodiment, a refractive index variation as a function of temperature (dn/dt) of the first lens L1 is $4.9 \times 10^{-6}$ $K^{-1}$, and a refractive index variation as a function of temperature (dn/dt) of the fourth lens L4 is $4.9 \times 10^{-6}$ $K^{-1}$. In this embodiment, a ratio of an effective focal length of the imaging lens 10a to an effective focal length of the first lens L1 is −0.4, and a ratio of an effective focal length of the imaging lens 10a to an effective focal length of the fourth lens L4 is 0.22.

In one embodiment, the full field of view (FOV) of an imaging lens is greater than 120 degrees. In another embodiment, the FOV is greater than 125 degrees. In still another embodiment, the FOV is greater than 130 degrees. The imaging lens may achieve wide field of views to broaden the extent of a given scene imaged by the imaging lens and thus benefit, for example, the use with surveillance applications.

In one embodiment, a chief ray angle (CRA) for the imaging lens is smaller than 15 degrees, where the chief ray angle is measured between a chief ray incident to an image plane and the normal of the image plane. Meeting the above condition is beneficial to fit the arrangement of macro lenses of a photosensor to achieve improved image brightness.

In one embodiment, the imaging lens may satisfy a condition of 1.1≤F/#≤1.8, a further condition of 1.1≤F/#≤1.7, and a still further condition of 1.1≤F/#≤1.6, where F/# denotes an F number of the imaging lens. Meeting the above conditions may reduce noises in an image captured by a photosensor under low-light conditions.

In one embodiment, a ratio of an off-axis irradiance to an on-axis irradiance in the image plane is greater than 50%, where the off-axis irradiance is measured at positions having a full field of view of greater than 120 degrees and the on-axis irradiance is measured on the optical axis of the image plane. In another embodiment, the ratio is greater than 55%. In still another embodiment, the ratio is greater than 60%.

Figure 5:
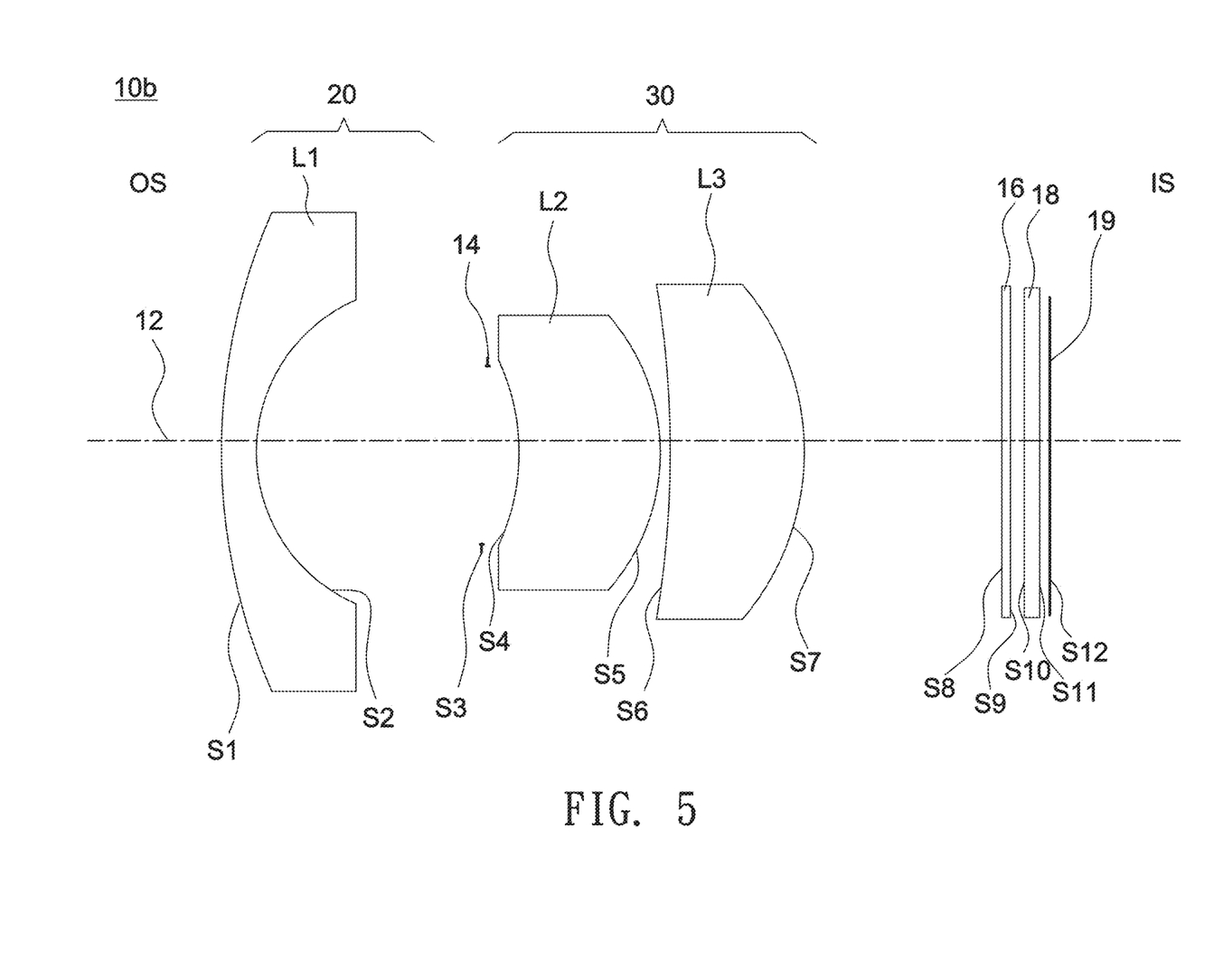
FIG. 5 shows a cross-sectional illustration of an imaging lens according to an embodiment of the invention.

FIG. 5 shows a cross-sectional illustration of an imaging lens according to a second embodiment of the invention. The imaging lens 10b shown in FIG. 5 includes, in a lens barrel (not shown) from a first side (magnified side OS) to a second side (minified side IS), a first lens L1, an aperture stop 14, a second lens L2 and a third lens L3. The first lens L1 forms a first lens group 20 with a negative refractive power, and the second lens L2 and a third lens L3 form a second lens group 30 with a positive refractive power. In this embodiment, the refractive powers of the first lens L1 to the third lens L3 are negative, positive and positive, all of the lenses L1-L3 are made from glass, and the second lens L2 is an aspheric lens. In this embodiment, the aspheric lens is made from glass molding. In other embodiment, the aspheric glass lens may be replaced with an aspheric plastic lens. Detailed optical data and design parameters of the imaging lens 10b are shown in Table 3 below.

TABLE 3

F/# = 1.0; LT = 20.92 (mm) FOV = 153 degrees; IMH60 = 3.27(mm)

| surface | radius of curvature (mm) | interval (mm) | refractive index | Abbe number | object description |
|---|---|---|---|---|---|
| S1 | 21.60 | 1.22 | 2.05 | 26.9 | L1(meniscus) |
| S2 | 6.18 | 8.28 | | | |
| S3 | INF. | 1.23 | | | aperture stop 14 |
| S4* | −12.07 | 5 | 1.80 | 40.2 | L2(aspheric) |
| S5* | −6.71 | 0.17 | | | |
| S6 | −58.26 | 5 | 2.05 | 26.9 | L3(meniscus) |
| S7 | −9.92 | 7.25 | | | |
| S8 | INF. | 0.3 | 1.51 | 64.1 | light filter 16 |
| S9 | INF. | 0.5 | | | |
| S10 | INF. | 0.5 | 1.51 | 64.1 | cover glass 18 |
| S11 | INF. | 0.52 | | | |
| S12 | | | | | image plane 19 |

Table 4 lists aspheric coefficients and conic constant of each aspheric surface of the imaging lens 10b according to the second embodiment of the invention.

TABLE 4

| | S4 | S5 |
|---|---|---|
| k | 0 | 0 |
| A | −1.92E−03 | 1.52E−04 |
| B | −1.19E−04 | 1.94E−05 |
| C | 9.92E−06 | −8.80E−07 |
| D | −5.22E−07 | 3.15E−08 |

In the above Table 3, an interval of the surface S1 is a distance between the surface S1 and the surface S2 along the optical axis 12, an interval of the surface S2 is a distance between the surface S2 and the surface S3 along the optical axis 12, and an interval of the surface S11 is a distance between the surface S11 and the image plane 19 for infrared light along the optical axis 12.

In this embodiment, a refractive index variation as a function of temperature (dn/dt) of the first lens L1 is $4.9 \times 10^{-6}$ $K^{-1}$, and a refractive index variation as a function of temperature (dn/dt) of the third lens L3 is $4.9 \times 10^{-6}$ $K^{-1}$. In this embodiment, a ratio of an effective focal length of the imaging lens 10b to an effective focal length of the first lens L1 is −0.38, and a ratio of an effective focal length of the imaging lens 10b to an effective focal length of the third lens L3 is 0.3.

Figure 9:
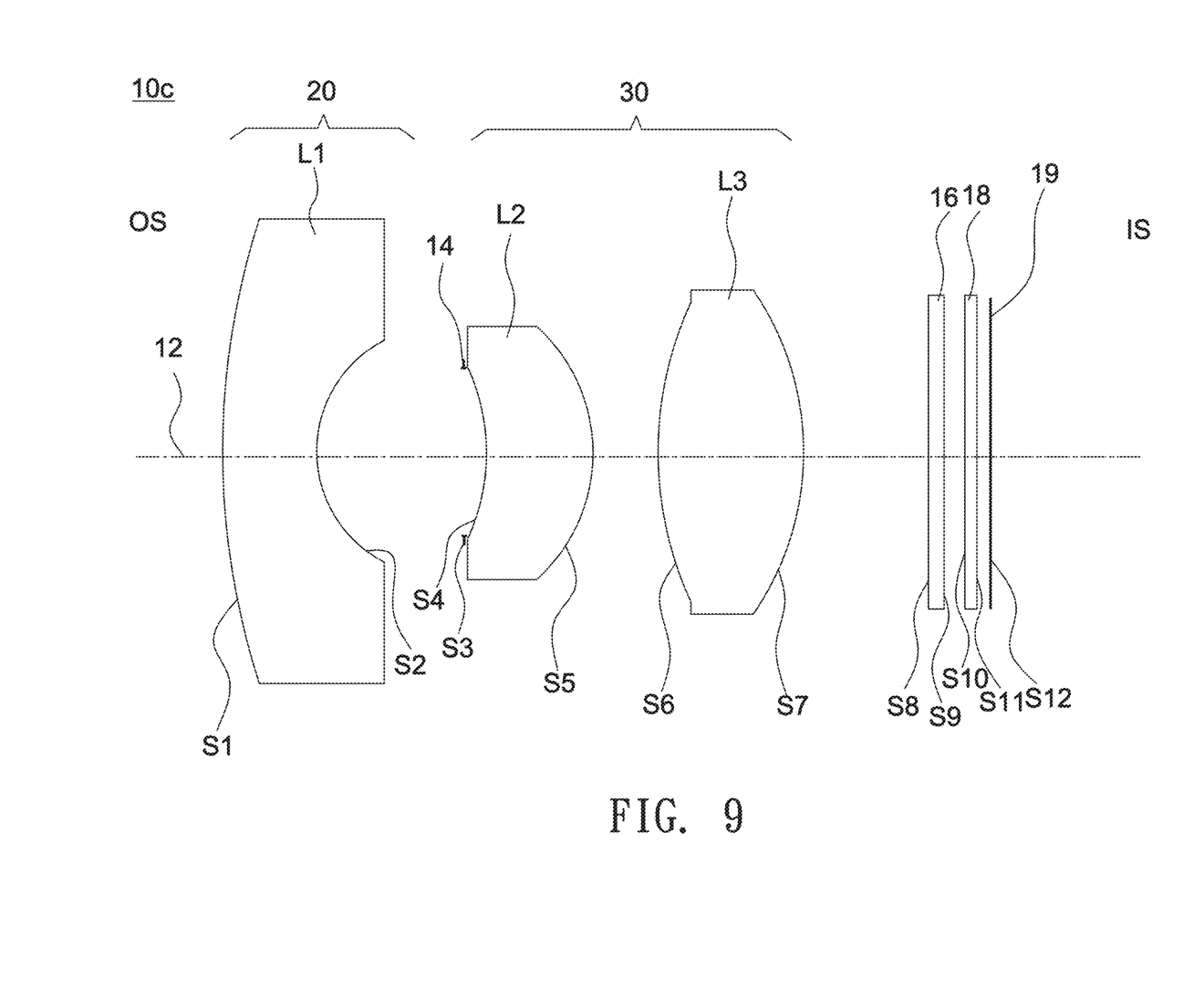
FIG. 9 shows a cross-sectional illustration of an imaging lens according to an embodiment of the invention.

FIG. 9 shows a cross-sectional illustration of an imaging lens according to a third embodiment of the invention. The imaging lens 10c shown in FIG. 9 includes, in a lens barrel (not shown) from a first side (magnified side OS) to a second side (minified side IS), a first lens L1, an aperture stop 14, a second lens L2 and a third lens L3. The first lens L1 forms a first lens group 20 with a negative refractive power, and the second lens L2 and a third lens L3 form a second lens group 30 with a positive refractive power. In this embodiment, the refractive powers of the first lens L1 to the third lens L3 are negative, positive and positive, all of the lenses L1-L3 are made from glass, and the second lens L2 and the third lens L3 are aspheric lenses. In this embodiment, the aspheric lenses are made from glass molding. In other embodiment, the aspheric glass lenses may be replaced with aspheric plastic lenses. Detailed optical data and design parameters of the imaging lens 10c are shown in Table 5 below.

TABLE 5

F/# = 1.0; LT = 22.55 (mm) FOV = 158 degrees; IMH60 = 3.25(mm)

| surface | radius of curvature (mm) | interval (mm) | refractive index | Abbe number | object description |
|---|---|---|---|---|---|
| S1 | 27.21 | 3.67 | 2.00 | 29.1 | L1(meniscus) |
| S2 | 4.57 | 5.66 | | | |
| S3 | INF. | 0.84 | | | aperture stop 14 |
| S4* | −19.05 | 4.13 | 1.71 | 29.6 | L2(aspheric) |
| S5* | −8.88 | 2.66 | | | |
| S6* | 9.70 | 5.56 | 1.71 | 29.6 | L3(aspheric) |
| S7* | −10.49 | 5.00 | | | |
| S8 | INF. | 0.21 | 1.51 | 64.1 | light filter 16 |
| S9 | INF. | 1 | | | |
| S10 | INF. | 0.5 | 1.51 | 64.1 | cover glass 18 |
| S11 | INF. | 0.73 | | | |
| S12 | | | | | image plane 19 |

Table 6 lists aspheric coefficients and conic constant of each aspheric surface of the imaging lens 10c according to the third embodiment of the invention.

TABLE 6

| | S4 | S5 | S6 | S7 |
|---|---|---|---|---|
| k | 0 | 0 | 0 | 0 |
| A | −1.76E−03 | −1.23E−03 | −8.89E−04 | 2.47E−04 |
| B | −2.83E−05 | 1.41E−05 | 1.04E−05 | −6.35E−06 |
| C | −1.10E−07 | −3.28E−07 | −1.27E−07 | 1.35E−07 |
| D | −1.86E−07 | −9.85E−09 | 8.31E−11 | −1.34E−09 |
| E | 2.78E−21 | 2.83E−21 | −2.04E−14 | 4.21E−14 |

In the above Table 5, an interval of the surface S1 is a distance between the surface S1 and the surface S2 along the optical axis 12, an interval of the surface S2 is a distance between the surface S2 and the surface S3 along the optical axis 12, and an interval of the surface S11 is a distance between the surface S1 and the image plane 19 for infrared light along the optical axis 12.

In this embodiment, a refractive index variation as a function of temperature (dn/dt) of the first lens L1 is $4.5 \times 10^{-6}$ K$^{-1}$, and a refractive index variation as a function of temperature (dn/dt) of the third lens L3 is $-1.0 \times 10^{-6}$ K$^{-1}$. In this embodiment, a ratio of an effective focal length of the imaging lens 10c to an effective focal length of the first lens L1 is −0.55, and a ratio of an effective focal length of the imaging lens 10c to an effective focal length of the third lens L3 is 0.41.

Figure 2:
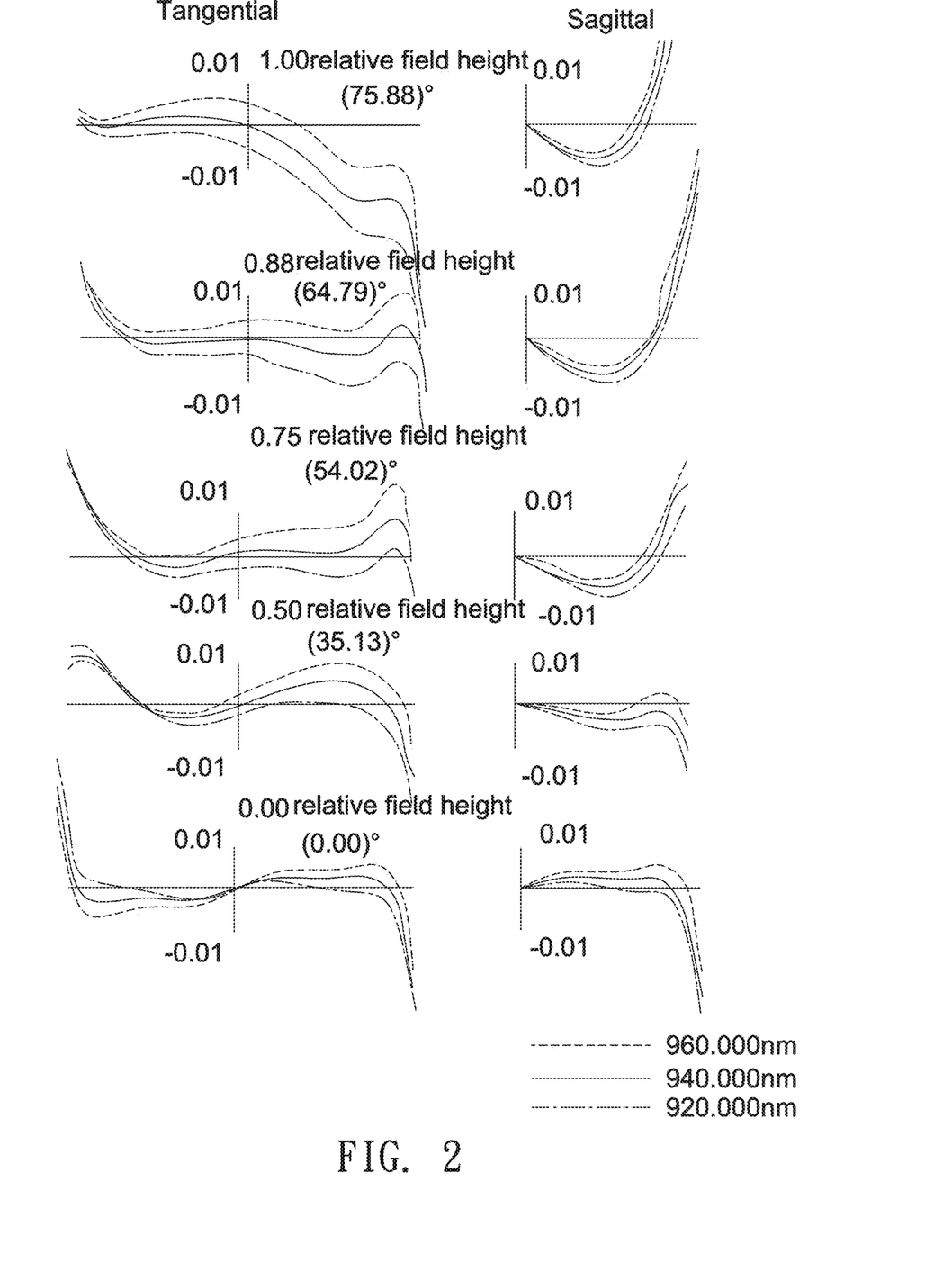
FIG. 2 shows a ray fan plot for infrared light of the imaging lens shown in FIG. 1.
Figure 3:
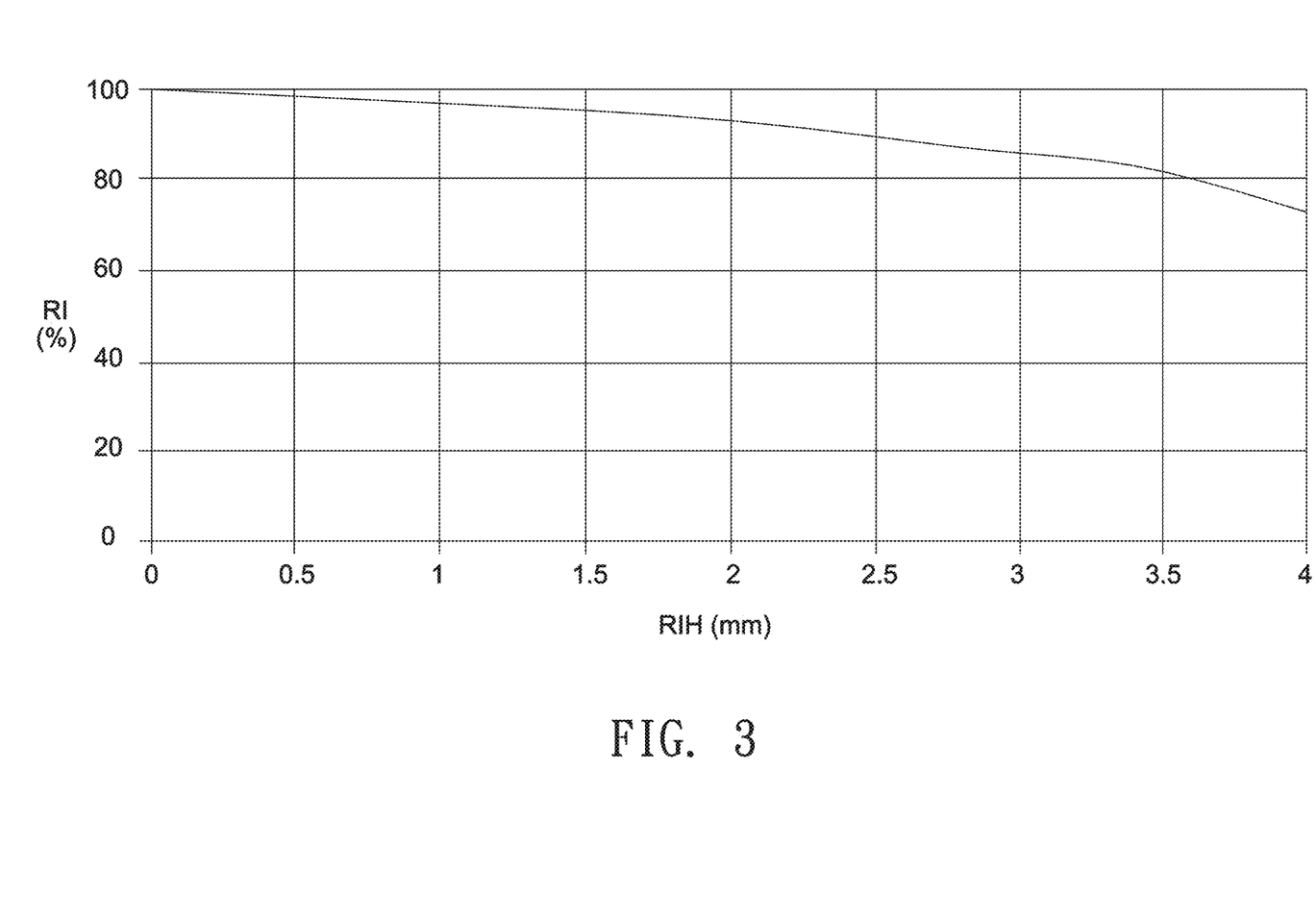
FIG. 3 shows numerical values of relative illumination of the imaging lens shown in FIG. 1 at different image heights of an image plane, and FIGS. 4A and 4B respectively illustrate a field curvature plot and a distortion plot of the imaging lens shown in FIG. 1.
Figure 4A:
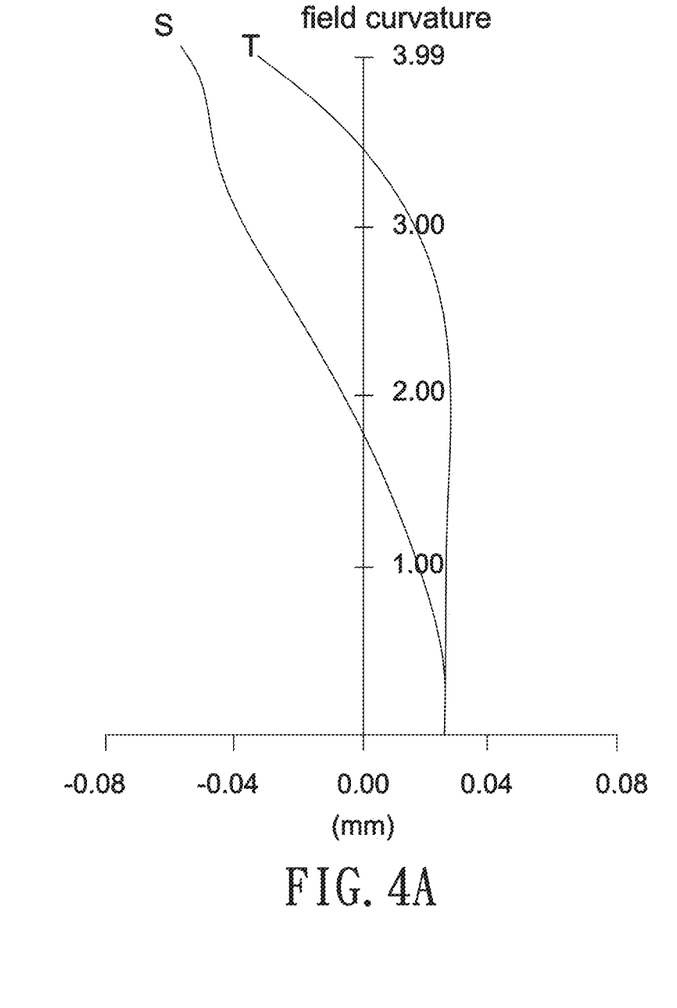
Figure 4B:
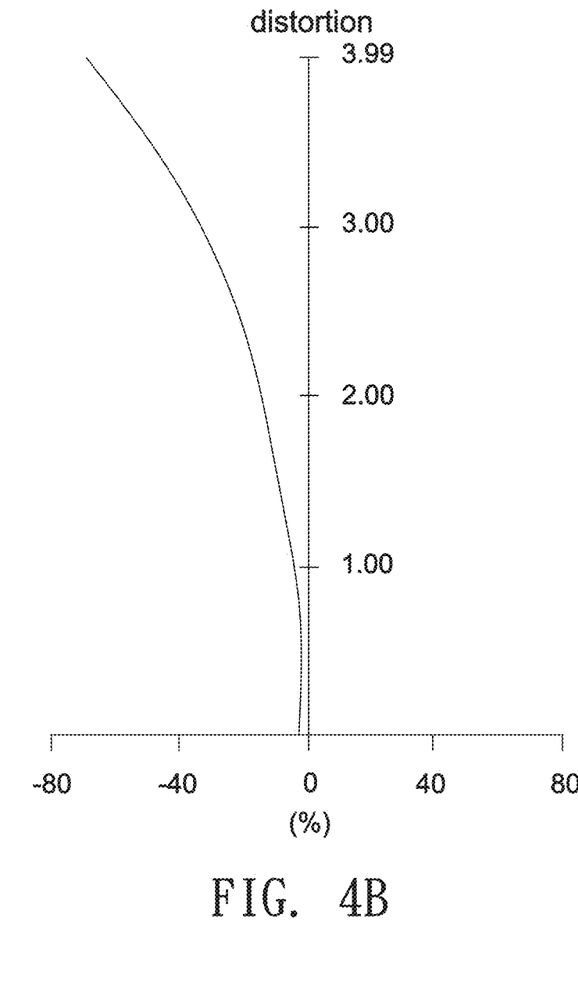
Figure 6:
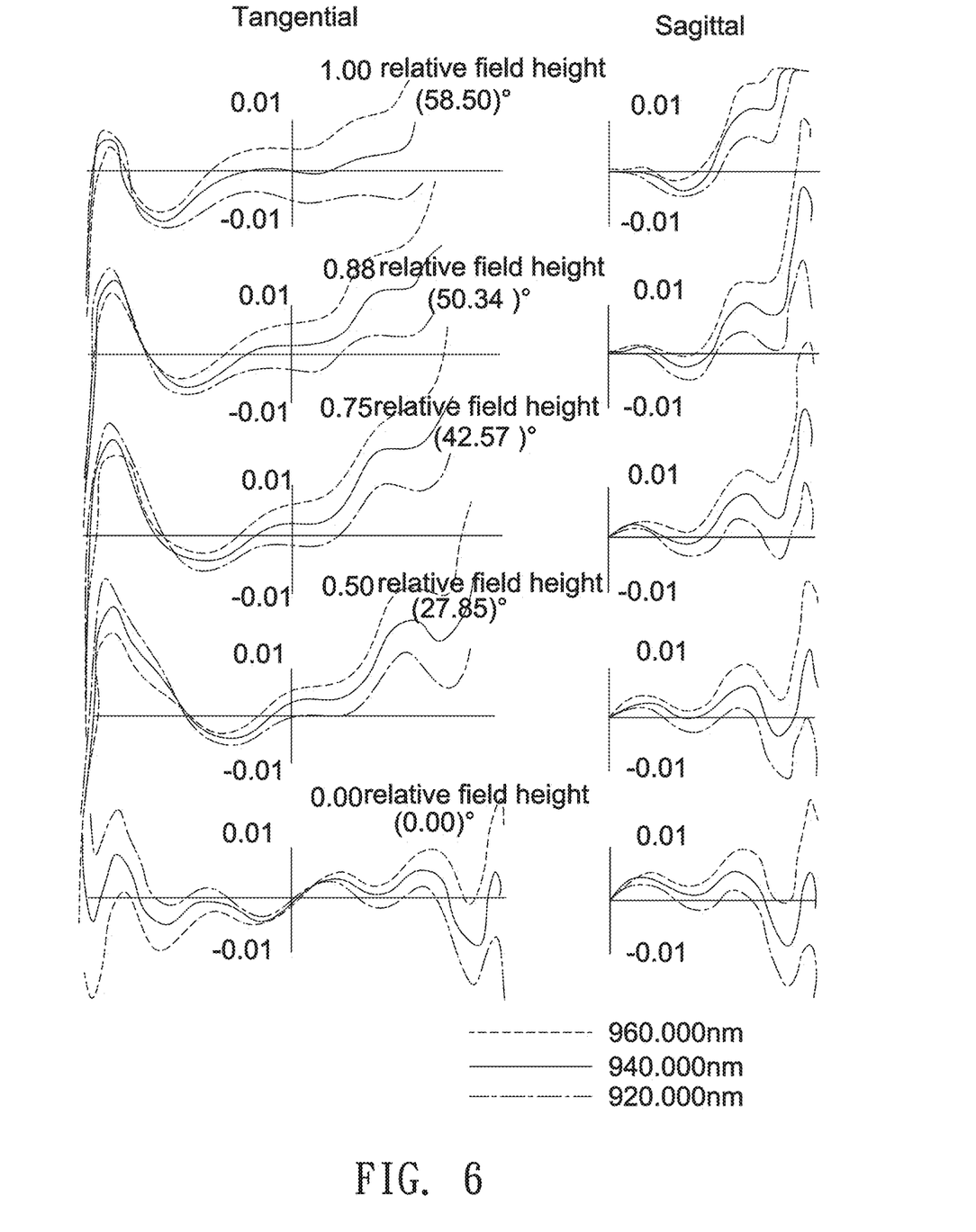
FIG. 6 shows a ray fan plot for infrared light of the imaging lens shown in FIG. 5.
Figure 7:
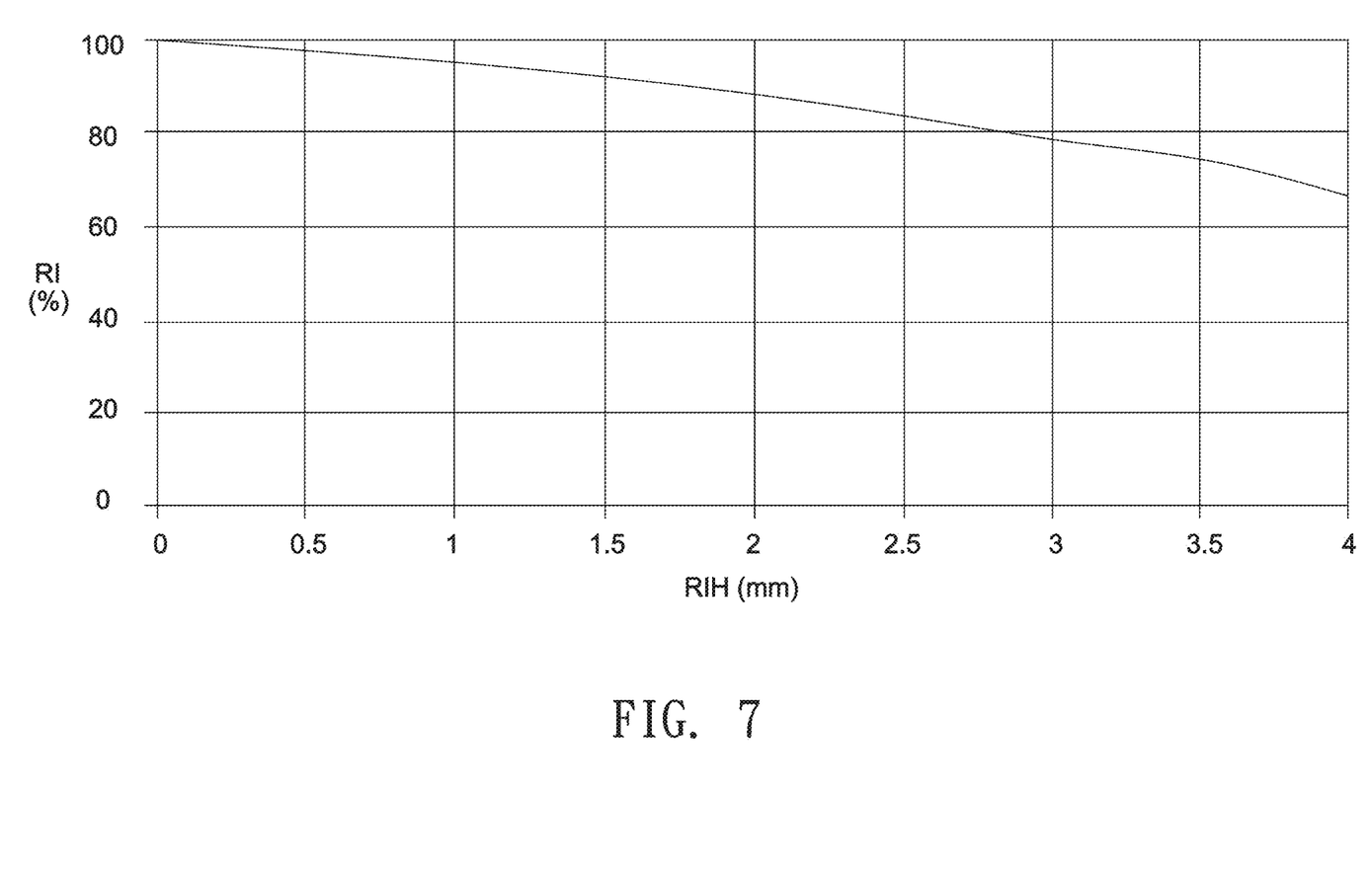
FIG. 7 shows numerical values of relative illumination of the imaging lens shown in FIG. 5 at different image heights of an image plane, and FIGS. 8A and 8B respectively illustrate a field curvature plot and a distortion plot of the imaging lens shown in FIG. 5.
Figure 8A:
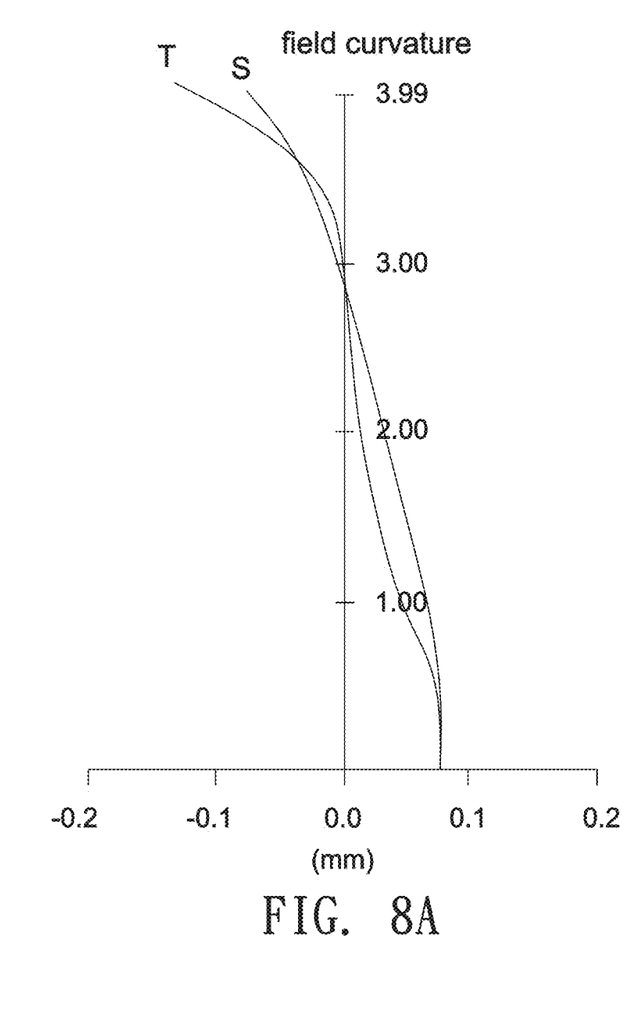
Figure 8B:
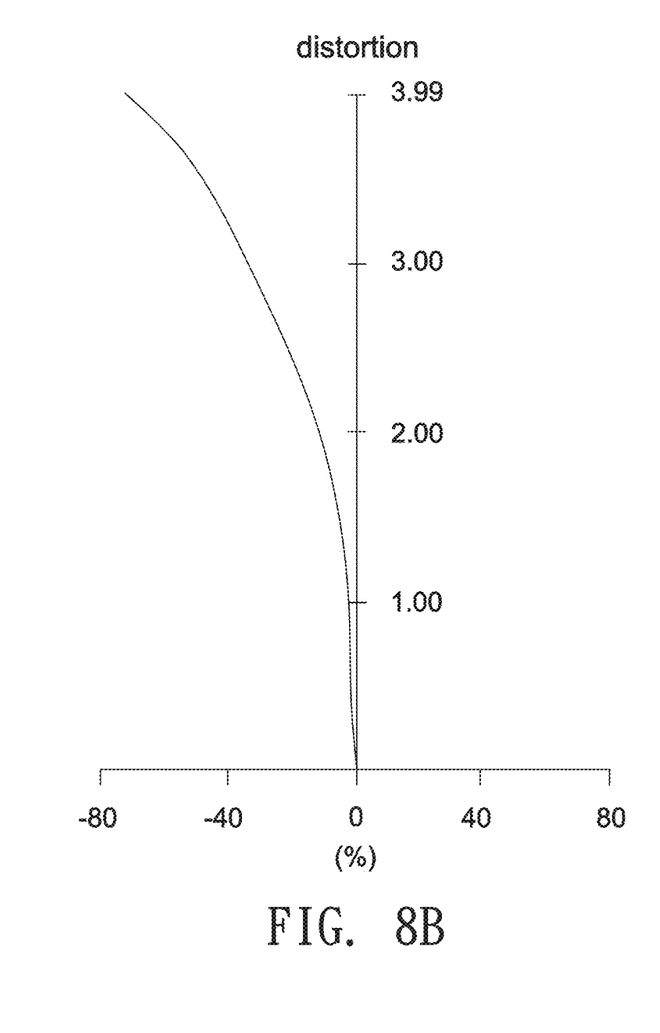
Figure 10:
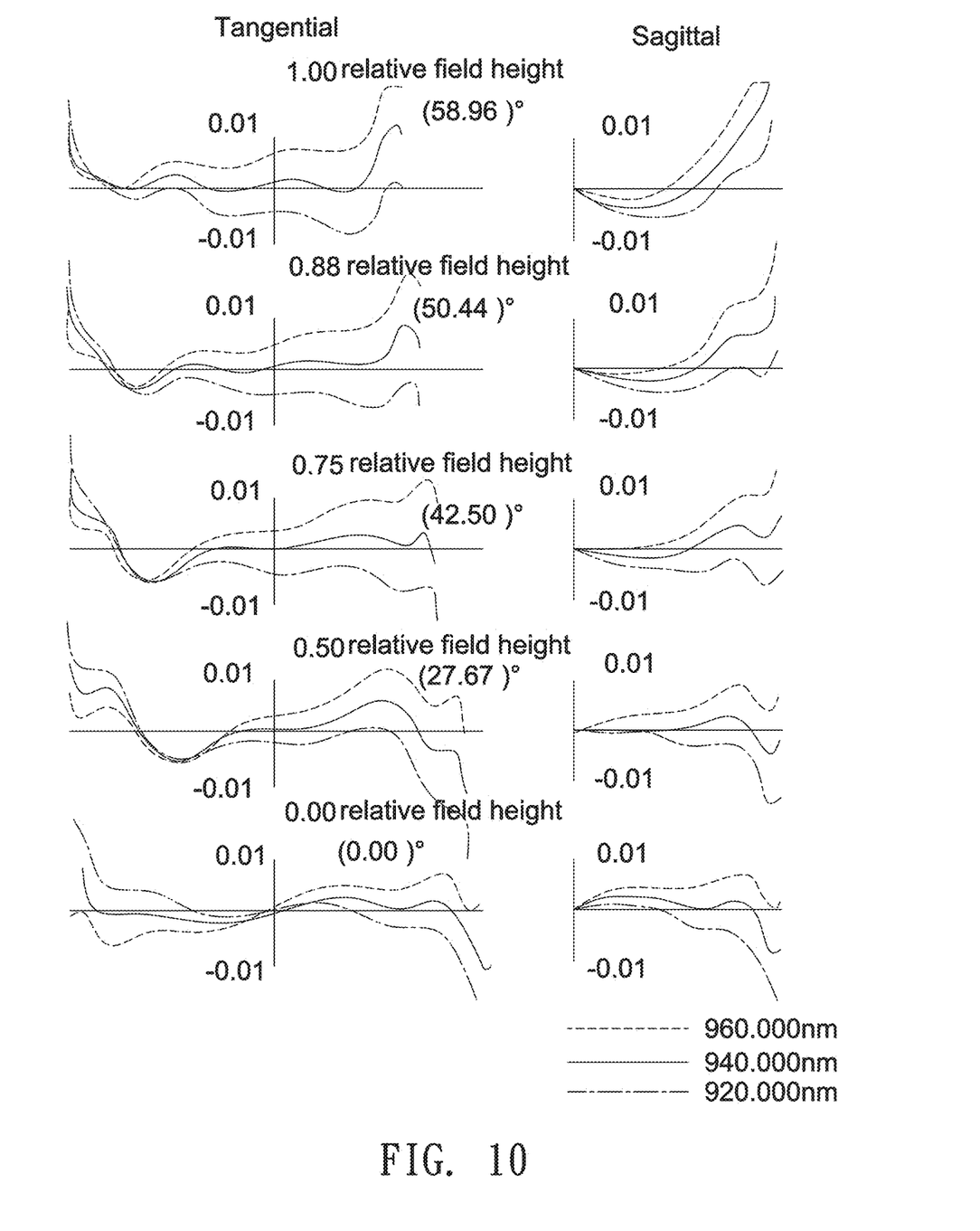
FIG. 10 shows a ray fan plot for infrared light of the imaging lens shown in FIG. 9.
Figure 11:
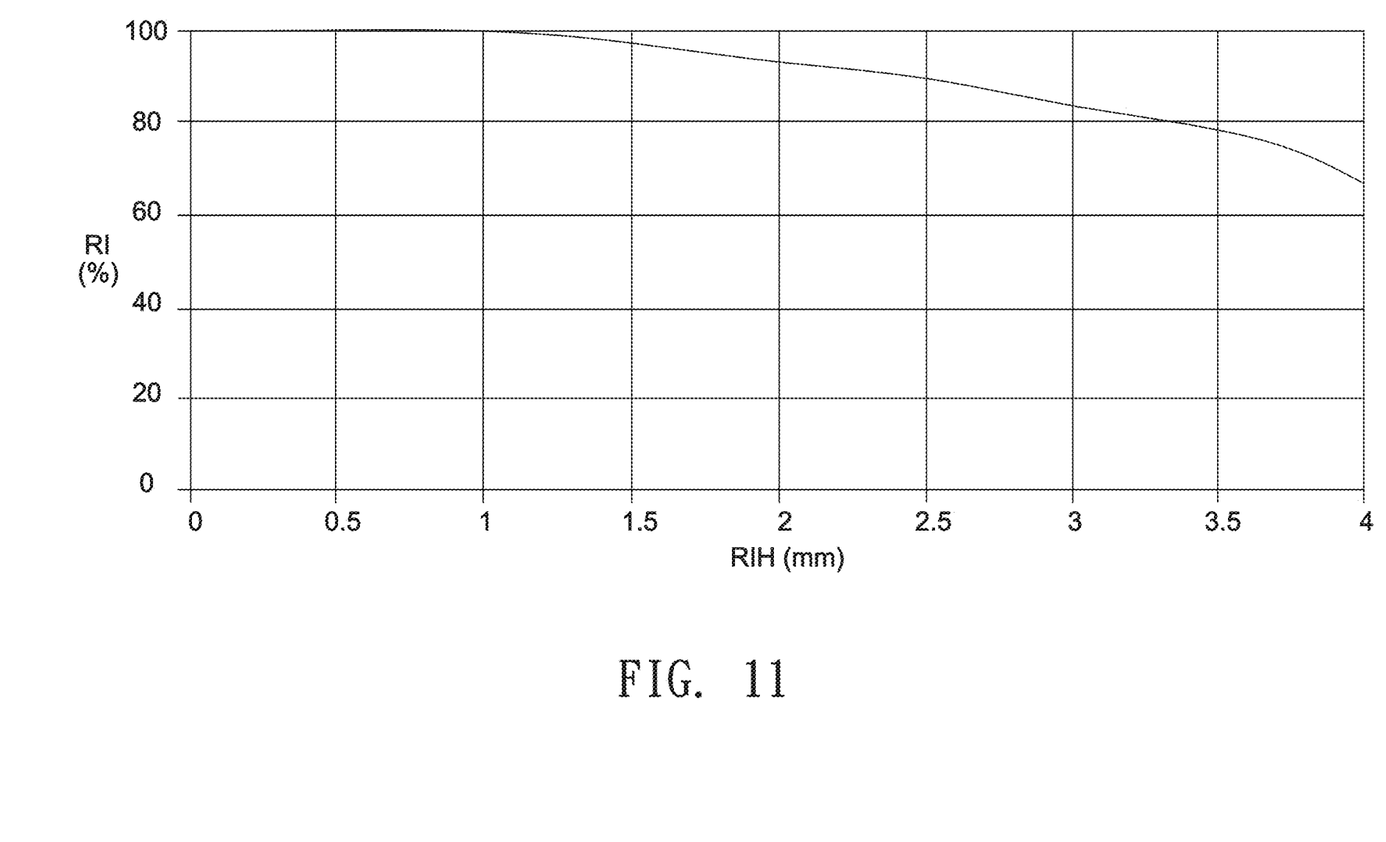
FIG. 11 shows numerical values of relative illumination of the imaging lens shown in FIG. 9 at different image heights of an image plane, and FIGS. 12A and 12B respectively illustrate a field curvature plot and a distortion plot of the imaging lens shown in FIG. 9.
Figure 12A:
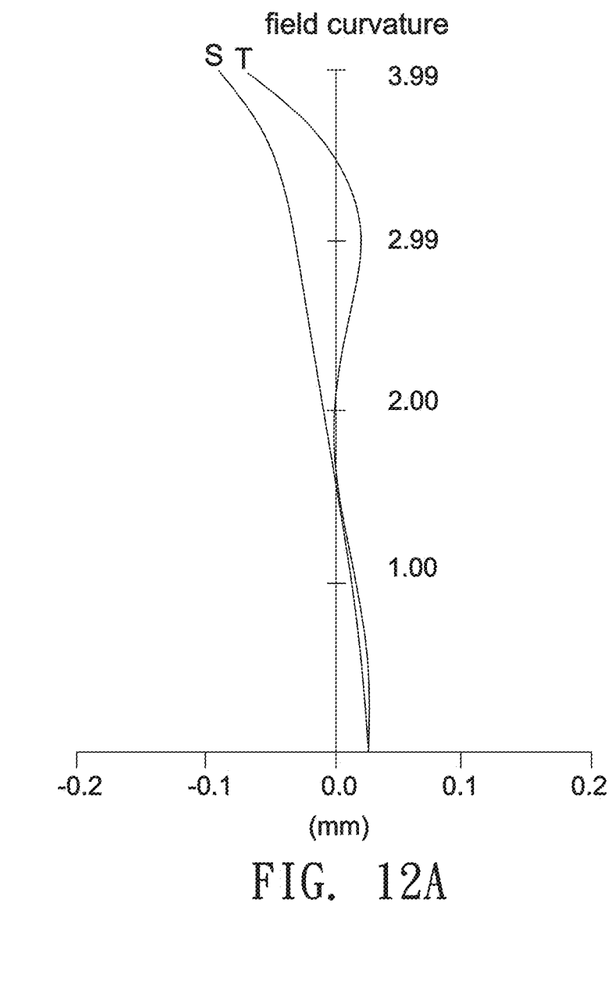
Figure 12B:
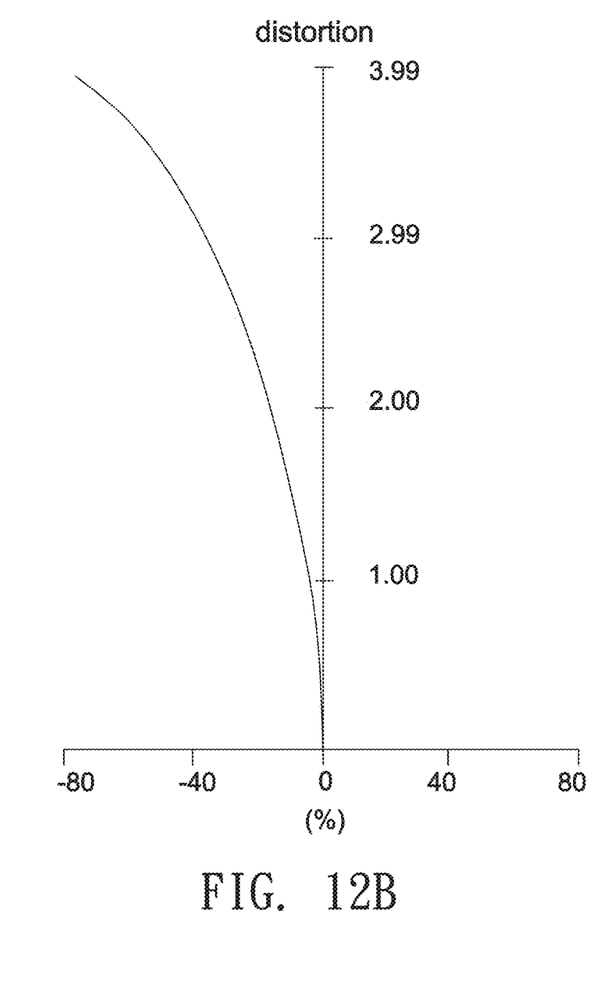

FIGS. 2, 3, 4A and 4B show optical simulation results of the imaging lens 10a, FIGS. 6, 7, 8A and 8B show optical simulation results of the imaging lens 10b, and FIGS. 10, 11, 12A and 12B show optical simulation results of the imaging lens 10c. FIGS. 2, 6 and 10 respectively show ray fan plots for infrared light of the imaging lens 10a, 10b and 10c, where the abscissa of each ray fan plot represents a normalized distance between the optical axis and a light ray intercepting an entrance pupil and normalized against the radius of an aperture stop, and the ordinate of each plot represents a distance of a light ray intercepting an image plane relative to the position of a chief ray on the image plane. FIGS. 3, 7 and 11 show numerical values of relative illumination at different image heights on an image plane according to various embodiments of the invention. FIGS. 4A, 8A and 12A respectively illustrate field curvature plots of the imaging lens 10a, 10b and 10c. FIGS. 4B, 8B and 12B respectively illustrate distortion plots of the imaging lens 10a, 10b and 10c. The simulated results shown in the above figures are within permitted ranges specified by the standard, which indicates the imaging lens 10a, 10b and 10c may achieve good optical performance and imaging quality.

Figure 13:
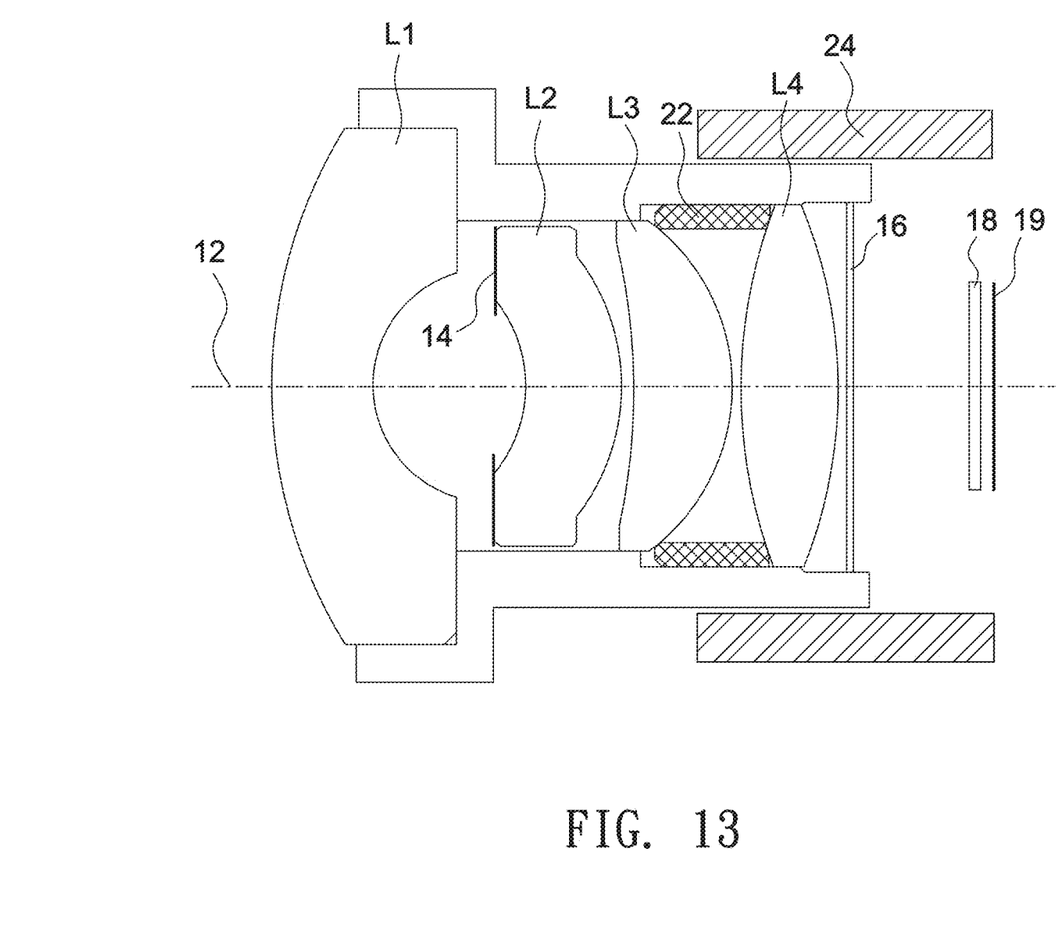
FIG. 13 shows a schematic diagram of a lens barrel having a spacer and a holder according to an embodiment of the invention.

FIG. 13 shows a schematic diagram of a lens barrel having a spacer and a holder according to an embodiment of the invention. In this embodiment, the spacer 22 is disposed between two lenses (the lenses L3 and L4 in this embodiment) that are furthest from the first lens group or closest to the second side (minified side). Further, a thermal expansion coefficient of the spacer 22 is larger than a thermal expansion coefficient of the holder 24. According to this arrangement, a focus shift measured between an in-focus position at 105° C. and an in-focus position at 25° C. is smaller than 0.015 mm. Therefore, the imaging lenses 10a, 10b and 10c may achieve low and controllable thermal shift.

According to the above embodiments, the imaging lens may achieve good imaging quality, wide viewing angles, reduced fabrication costs, and lighter weight. Further, according to the above embodiments, the imaging lens is allowed to operate in the range of −40° C. to 125° C. and has a total lens number of 3 or 4. Therefore, the imaging lens may achieve good imaging quality and resolution, lower fabrication costs, larger effective apertures, wider viewing angles, lighter weight and wider ranges of operating temperatures.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of all lenses of each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. An imaging lens, comprising:
    a first lens group with a refractive power comprising at least one lens with a negative refractive power;
    a second lens group with a positive refractive power comprising at least one aspheric lens with a positive refractive power; and
    an aperture stop disposed between the first lens group and the second lens group, a total number of lenses with refractive powers in the imaging lens being less than 5, all lenses of the imaging lens being made from glass, a full field of view of the imaging lens being greater than 120 degrees, and an F-number of the imaging lens being in the range of 1.1 to 1.6.

2. The imaging lens as claimed in claim 1, further comprising:
    a spacer disposed between two lenses furthest from the first lens group of the imaging lens; and a holder, wherein a thermal expansion coefficient of the spacer is larger than a thermal expansion coefficient of the holder.

3. The imaging lens as claimed in claim 1, wherein the imaging lens satisfies one of the following conditions:
   (1) a lens closest to a magnified side of the imaging lens has a positive refractive index variation as a function of temperature (dn/dt), and a ratio of an effective focal length of the imaging lens to an effective focal length of the lens closest to the magnified side is in the range of −0.6 to −0.3;
   (2) a lens closest to a minified side of the imaging lens has a negative refractive index variation as a function of temperature (dn/dt), and a ratio of an effective focal length of the imaging lens to an effective focal length of the lens closest to the minified side is in the range of 0.1 to 0.5.

4. The imaging lens as claimed in claim 1, wherein the imaging lens further comprises a visible light blocking filter.

5. The imaging lens as claimed in claim 1, wherein a ratio of off-axis irradiance to on-axis irradiance in an image plane is greater than 50%, where the off-axis irradiance is measured at positions having a full field of view of greater than 120 degrees and the on-axis irradiance is measured on the optical axis of the image plane.

6. The imaging lens as claimed in claim 1, wherein the imaging lens satisfies one of the following conditions:
   (1) the imaging lens comprises, in order from a magnified side to a minified side, a meniscus lens, a bi-convex lens, an aspheric lens and a meniscus lens;
   (2) the imaging lens comprises, in order from a magnified side to a minified side, a meniscus lens, an aspheric lens and a meniscus lens;
   (3) the imaging lens comprises, in order from a magnified side to a minified side, a meniscus lens, an aspheric lens and an aspheric lens.

7. The imaging lens as claimed in claim 1, wherein the imaging lens satisfies one of the following conditions:
   (1) a chief ray angle measured between a chief ray incident to an image plane and a normal of the image plane is smaller than 15 degrees;
   (2) a focus shift measured between an in-focus position at 105° C. and an in-focus position at 25° C. is smaller than 0.015 mm.

8. The imaging lens as claimed in claim 1, wherein the first lens group includes a first lens and a second lens, the seconds lens group includes a third lens and a fourth lens, and an operating temperature of the imaging lens is in the range of −40° C. to 125° C.

9. The imaging lens as claimed in claim 8, further comprising:
   a spacer disposed between two lenses furthest from the first side of the imaging lens; and
   a holder, wherein a thermal expansion coefficient of the spacer is larger than a thermal expansion coefficient of the holder.

10. The imaging lens as claimed in claim 8, wherein the imaging lens satisfies one of the following conditions:
    (1) a lens closest to the first side of the imaging lens has a positive refractive index variation as a function of temperature (dn/dt), and a ratio of an effective focal length of the imaging lens to an effective focal length of the lens closest to the first side is in the range of −0.6 to −0.3;
    (2) a lens closest to the second side of the imaging lens has a positive refractive index variation as a function of temperature (dn/dt), and a ratio of an effective focal length of the imaging lens to an effective focal length of the lens closest to the second side is in the range of 0.1 to 0.5.

11. The imaging lens as claimed in claim 8, wherein the imaging lens further comprises a visible light blocking filter.

12. The imaging lens as claimed in claim 8, wherein a ratio of off-axis irradiance to on-axis irradiance in an image plane is greater than 50%, where the off-axis irradiance is measured at positions having a full field of view of greater than 120 degrees and the on-axis irradiance is measured on the optical axis of the image plane.

13. The imaging lens as claimed in claim 8, wherein the first lens, the second lens, the third lens and the fourth lens are a meniscus lens, a bi-convex lens, an aspheric lens and a meniscus lens, respectively.

14. The imaging lens as claimed in claim 8, wherein the imaging lens satisfies one of the following conditions:
    (1) a chief ray angle measured between a chief ray incident to an image plane and a normal of the image plane is smaller than 15 degrees;
    (2) a focus shift measured between an in-focus position at 105° C. and an in-focus position at 25° C. is smaller than 0.015 mm.

15. The imaging lens as claimed in claim 1, wherein the imaging lens has at most two glass lenses with refractive powers between the aperture stop and a minified side, the imaging lens has at most two aspheric glass lenses with refractive powers between the aperture stop and the minified side, a lens closest to a magnified side of the imaging lens having a positive refractive index variation as a function of temperature (dn/dt), and a ratio of an effective focal length of the imaging lens to an effective focal length of the lens closest to the magnified side being in the range of −0.6 to −0.3.

16. The imaging lens as claimed in claim 15, wherein a lens closest to the minified side of the imaging lens has a negative refractive index variation as a function of temperature (dn/dt), and a ratio of an effective focal length of the imaging lens to an effective focal length of the lens closest to the minified side is in the range of 0.1 to 0.5.

17. The imaging lens as claimed in claim 15, further comprising:
    a spacer disposed between two lenses closet to the minified side of the imaging lens; and
    a holder, wherein a thermal expansion coefficient of the spacer is larger than a thermal expansion coefficient of the holder.

18. The imaging lens as claimed in claim 15, wherein a ratio of off-axis irradiance to on-axis irradiance in an image plane is greater than 50%, where the off-axis irradiance is measured at positions having a full field of view of greater than 120 degrees and the on-axis irradiance is measured on the optical axis of the image plane.

19. The imaging lens as claimed in claim 15, wherein a chief ray angle measured between a chief ray incident to an image plane and a normal of the image plane is smaller than 15 degrees.

20. The imaging lens as claimed in claim 15, wherein a focus shift measured between an in-focus position at 105° C. and an in-focus position at 25° C. is smaller than 0.015 mm.

* * * * *